United States Patent [19]

Shepherd et al.

[11] Patent Number: 5,679,098
[45] Date of Patent: Oct. 21, 1997

[54] CLUTCH CONTROL SYSTEM

[75] Inventors: Paul Vincent Shepherd, Long Itchington; Charles John Jones, Coventry, both of United Kingdom

[73] Assignee: Automotive Products, plc, Leamington Spa, England

[21] Appl. No.: 535,003

[22] PCT Filed: Feb. 10, 1995

[86] PCT No.: PCT/GB95/00266

§ 371 Date: Sep. 29, 1995

§ 102(e) Date: Sep. 29, 1995

[87] PCT Pub. No.: WO95/22013

PCT Pub. Date: Aug. 17, 1995

[30] Foreign Application Priority Data

Feb. 12, 1994 [GB] United Kingdom ............... 9402730

[51] Int. Cl.⁶ .................................................. B60K 41/02
[52] U.S. Cl. ........................ 477/166; 477/175; 477/180
[58] Field of Search ................................ 477/166, 174, 477/175, 180

[56] References Cited

U.S. PATENT DOCUMENTS

| | | | |
|---|---|---|---|
| 4,561,530 | 12/1985 | Parsons et al. | 477/175 X |
| 4,711,333 | 12/1987 | Okamura | 477/174 X |
| 4,800,497 | 1/1989 | Koori et al. | 364/424.1 |
| 4,817,776 | 4/1989 | Tateno et al. | |
| 4,881,627 | 11/1989 | Ishii | 477/174 X |
| 5,086,894 | 2/1992 | Iizuka et al. | 477/174 X |
| 5,332,073 | 7/1994 | Iizuka | 477/174 X |
| 5,427,215 | 6/1995 | Jarvis | 477/180 X |
| 5,489,012 | 2/1996 | Buckley et al. | 477/175 X |

FOREIGN PATENT DOCUMENTS

| | | |
|---|---|---|
| A0536932 | 4/1993 | European Pat. Off. |
| A3728851 | 3/1988 | Germany. |
| A2080910 | 2/1982 | United Kingdom. |
| A9208065 | 5/1992 | WIPO. |
| A9213208 | 8/1992 | WIPO. |
| A9310994 | 6/1993 | WIPO. |

*Primary Examiner*—Rodney H. Bonck
*Assistant Examiner*—Peter T. Kwon
*Attorney, Agent, or Firm*—Paul E. Milliken; Lee A. Germain

[57] ABSTRACT

A clutch control system for the automatic control of a motor vehicle clutch (14) which connects an engine (10) with a gearbox (12) under the control of a driver-operated gear ratio selector lever (24). The control system includes an electronic control unit (36) which controls initial clutch take-up on starting of the vehicle, clutch re-engagement following each ratio change, disengagement on movement of the gear selector lever (24) to change the operative ratio of the gearbox (12), and clutch disengagement on the coming to rest of the vehicle. The level of clutch engagement is controlled in response to an engine speed error signal (E) derived from a comparison of current engine speed (Ve) and a reference speed signal (Vr) generated by the control unit, the error signal being compared with a current clutch position signal (Vc) to produce a clutch actuation signal (Vce). The reference signal for initial clutch take-up is derived from one of the following references on a highest-wins basis: a reference signal proportional to the current throttle position (Va'), a reference signal porportional to the current engine idle speed (Vir), or a floating reference signal (Vfr) equal to a recorded engine speed plus an offset.

14 Claims, 3 Drawing Sheets

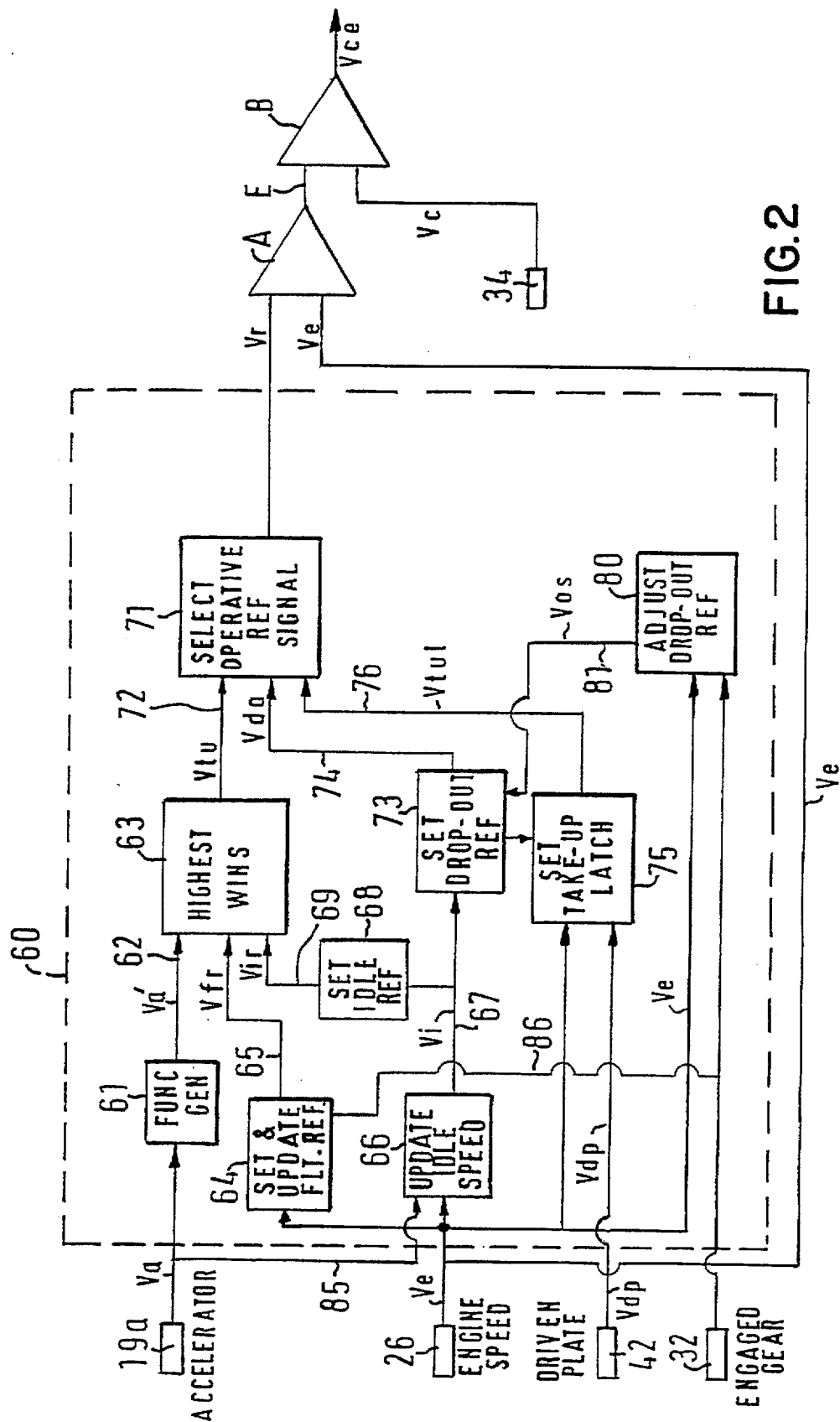

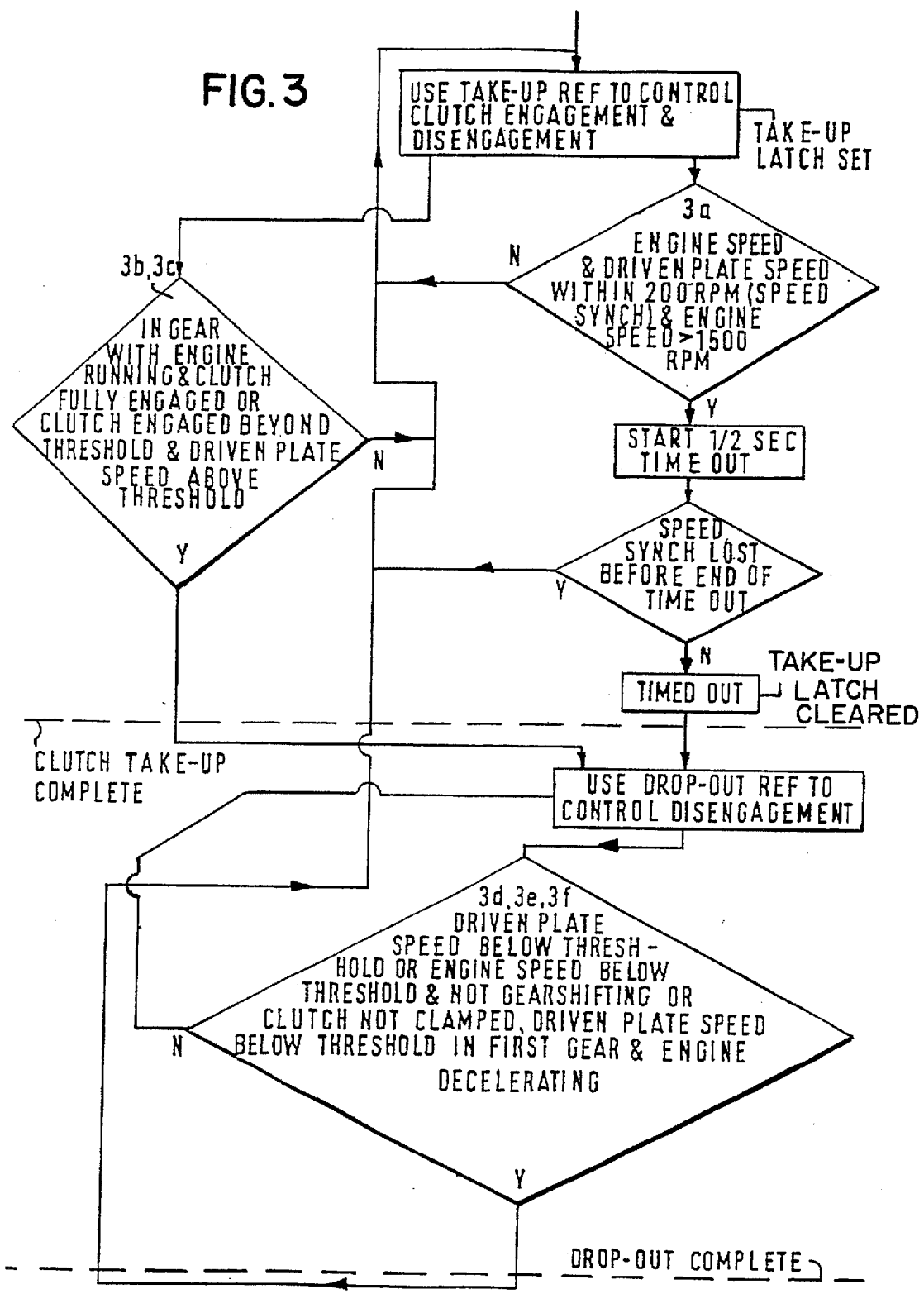

5,679,098

CLUTCH CONTROL SYSTEM

FIELD OF THE INVENTION

This invention relates to a clutch control system for the automatic control of a motor vehicle clutch which connects an engine with a gearbox under the control of a driver-operated gear ratio selector lever, the control system including an electronic control unit which controls initial clutch take-up on starting of the vehicle, clutch re-engagement following each ratio change, disengagement on movement of the gear selector lever to change the operative ratio of the gearbox, and clutch disengagement on the coming to rest of the vehicle, the level of clutch engagement being controlled in response to an engine speed error signal derived from a comparison of current engine speed and a reference speed signal generated by the control unit, said error signal being compared with a current clutch position signal to produce a clutch actuation signal. Such a clutch control system is herein after referred to as a clutch control system of the kind specified.

DESCRIPTION OF THE PRIOR ART

Examples of such systems are described in the Applicants earlier European Patents Nos. 0038113, 0043660, 0059035 and 0101220 and European Application No. 0566595.

Problems can arise with control systems of the kind specified if the operator raises the engine speed above idle and then moves the gear lever from neutral to a take-up gear. This can cause an inadvertent take-up of drive.

It is an object of the present invention to provide a control system of the kind specified which overcomes the above problem.

SUMMARY OF THE INVENTION

Thus according to the present invention there is provided a clutch control system of the kind specified characterised in that the reference signal for initial clutch take-up is derived from one of the three following references on a highest-wins basis:

a reference signal proportional to the current throttle position;

a reference signal proportional to the current engine idle speed, or a floating reference signal equal to a recorded engine speed plus an offset.

Thus, for example, if the operator increases the engine speed substantially above idle and then moves the gear lever to select a gear the system records a snapshot of the raised engine speed and the floating reference will thus be the largest of the three references and becomes the reference which controls clutch take-up. Thus until the operator raises the engine speed above the current floating reference value clutch engagement will not occur and hence inadvertent take-up of drive is avoided.

When the operator has raised the engine speed above the current floating reference value the clutch begins to transmit torque and the engine speed therefore falls. The engine speed is then below the no-load engine speed for the current throttle setting (i.e. the steady speed which the engine runs at for a given throttle position when under no load).

The system is arranged to ramp down the floating reference linearly as long as the engine speed is below the no-load engine speed for the current throttle setting. This promotes clutch engagement.

The system also reduces the floating reference to track any reduction in the engine speed that occurs when clutch is not transmitting torque so that the floating reference is equal to the current engine speed plus the floating reference offset.

Once the floating reference is below the throttle reference the throttle reference becomes the controlling reference on the highest-wins basis. The idle reference is determined by regularly monitoring idle speed after the system is keyed-on. The strategy for finding the lowest idle speed is to regularly check the engine speed when the throttle is closed and look for the lowest speed, subject to a lower limit.

The lowest idle speed found is modified (increased) if the idle speed is found to increase while the accelerator pedal is not pressed whilst the clutch driven plate speed is low indicating that the vehicle has stopped. Such an increase in idle speed is caused by an associated engine management system increasing the idle speed to respond to an increased engine load imposed by the switching on of accessories such as air conditioning.

The present invention also provides a clutch control system of the kind specified in which clutch take-up (ie. engagement) is considered complete when one of the following conditions applies:

the engine speed is within a predetermined range (e.g. 200 rpm) of the driven plate speed, the engine speed is above a first predetermined level of say 1500 rpm, and both these conditions have applied for a predetermined time period of say 0.5 seconds, or the vehicle is in gear with the engine running and the clutch fully engaged, or the clutch is engaged beyond a predetermined engagement threshold (e.g. beyond a given position of cylinder 22) and the driven plate speed is above a first predetermined threshold.

The control system sets a clutch drop-out reference on completion of clutch take-up. This drop-out reference determines the engine speed level and disengagement rate at which clutch disengagement occurs as vehicle engine speed decreases.

The invention also provides a clutch control system of the kind specified in which (i.e. disengagement) is considered complete when clutch drop-out one of the following conditions applies:

driven plate speed has fallen below a second predetermined threshold (e.g. 700 rpm), or engine speed has fallen below a second predetermined level (e.g. 700 rpm) if a gearshifting is not occurring, or the clutch is not clamped (ie. not fully engaged) with the driven plate speed below a third predetermined threshold (e.g. 1900 rpm) and first gear is selected with the engine decelerating.

Also in accordance with a further aspect of the present invention, there is provided a clutch control system of the kind specified in which when the vehicle engine is decelerating at above a predetermined rate, the drop-out reference is increased so that the clutch will start to disengage at a higher engine speed thus preventing stalling of the engine etc.

BRIEF DESCRIPTION OF THE DRAWINGS

The present invention will now be described by way of example only, with reference to the accompanying drawings in which:

FIG. 2 shows in logic diagram form the main steps in the generation of the reference signal in a control system embodying the present invention, and.

FIG. 3 shows in flow diagram form the criteria used by the control system to determine completion of clutch take-up and drop-out.

DESCRIPTION OF PREFERRED EMBODIMENTS

Figure 1:
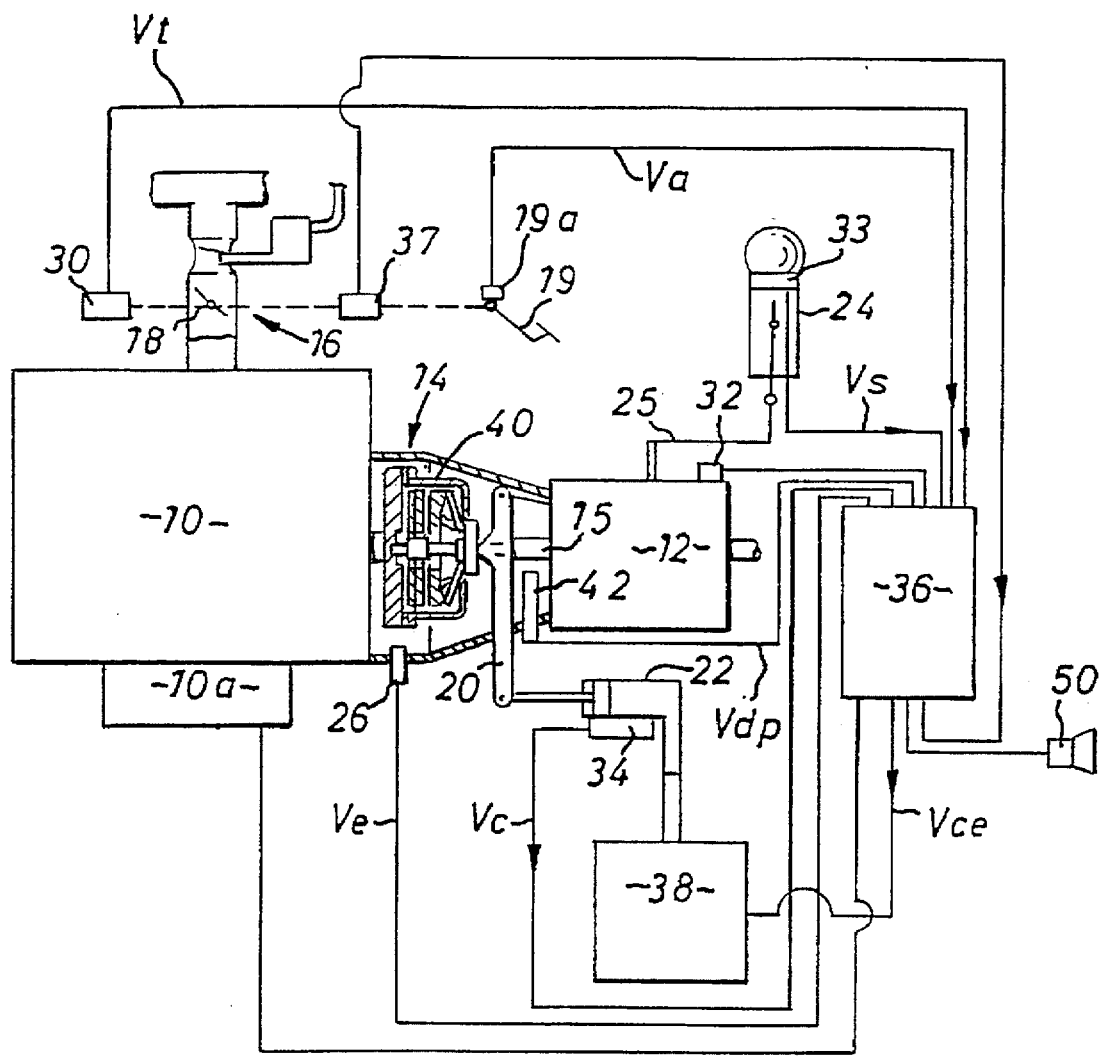
FIG. 1 shows in diagrammatic form the general layout of a clutch control system of the kind specified embodying the present invention.

Referring to FIG. 1 this shows an engine 10 with a starter and an associated starter circuit 10a which is coupled through a friction clutch 14 with a gearbox 12 via a gearbox input shaft 15. In the example described, fuel is supplied to the engine by a throttle 16 which includes a throttle valve 18 operated by accelerator pedal 19. The invention is equally applicable to electronic or mechanical fuel injected petrol or diesel engines.

The clutch 14 is actuated by a release fork 20 which is operated by a slave cylinder 22. The gearbox is controlled by a gear ratio selector lever 24 which is connected with the gearbox via a selector linkage 25 and which includes a load sensing switch means 33 which detects forces applied to the lever 24 by the driver and produces a signal Vs indicating an intention to change gear. An electronic control unit 36 controls the actuation of the clutch 14 via an hydraulic control 38 which controls the operation of slave cylinder 22. Control unit 36 receives signals Vs from gear lever 24 and signals Ve proportional to engine speed from engine speed sensor 26. Signals Vt from throttle valve position sensor 30 proportional to the current throttle opening and accelerator pedal position signals Va from an accelerator position sensor 19a are also fed to control unit 36. Control unit 36 also receives a gear signal Vg from gear position sensor 32 which corresponds to the gear ratio currently engaged, signals Vc from slave cylinder position sensor 34, which varying with the position of the slave cylinder, and signals Vdp proportional to clutch driven plate speed from speed sensor 42 which actually senses the speed of the gearbox input shaft 15 (which is equal to that of a driven plate 40 of the clutch 14). Since the speed of the vehicle depends on the driven plate speed and the gear engaged, the driven plate speed sensor 42 acts in effect as a vehicle speed sensor and vice versa. Thus in some applications no driven plate speed sensor 42 is provided and this speed is calculated from the gearbox ratio and the vehicle speed which is given by a vehicle speed sensor (not shown) of, for example, the variable reluctance type.

A throttle control 37 is operated by the control unit 36 so that the throttle can be opened and closed independently of the accelerator pedal 19.

A buzzer 50 is connected with control unit 36 to warn/indicate to the vehicle operator when certain vehicle operating conditions occur. In addition to or in place of buzzer 50 a flashing warning light (not shown) may be used.

Control unit 36 includes a reference signal generator 60 (see FIG. 2) which generates a reference signal Vr representative of a desired engine speed. This reference signal is compared in comparator A with the actual engine speed signal Ve from engine speed sensor 26 to produce an error signal E which is compared in comparator E with the clutch actuator position signal Vc from sensor 34 to provide a clutch engagement control signal Vce which the control unit 36 outputs to the hydraulic control 38. Operation of a control unit 36 in this general manner is described in more detail, for example in the Applicants earlier European Patents 0038113 and 0043660.

In addition to controlling the engagement and disengagement of clutch 14 the control unit 36 also controls the throttle setting via control 37 when its control logic indicates that an override of the throttle opening set by the driver's operation of the accelerator 19 is desirable. In some applications the throttle control 37 may be omitted.

FIG. 2 shows in more detail the make-up of the reference signal generator 60 which is the subject of the present invention.

The signal Va from the accelerator position sensor 19a is processed by a function generator 61 to produce a speed signal Va' on line 62 proportional to the accelerator position signal. Function generator 61 may produce a simple linear proportionality with offset between Va and Va' or a proportionality in linear segments. This signal is fed to a Highest Wins discriminator 63.

The engine speed signal Ve from sensor 26 is processed by a floating reference block 64 which is connected with gear sensor 32 via line 86. Block 64 produces a so-called floating reference signal Vfr which is equal to the engine speed Ve at the moment of gear selection (indicated by the signal from sensor 32) plus an off-set (typically 400 rpm). Thus Vfr=Ve+400 rpm. The floating reference Vfr is also fed to Highest Wins discriminator 63 via line 65.

Engine speed signal Ve is also continually monitored from keying-on of the system to look for the lowest engine idle speed obtained (subject to a lower limit) and this is stored in idle speed update block 66 which also receives signals from accelerator pedal sensor 19a via line 85 indicating when the pedal is not depressed and the engine is therefore idlling.

The lowest idle speed found is modified (increased) if the idle speed is found to increase while the accelerator pedal is not pressed whilst the clutch driven plate speed is low indicating that the vehicle has stopped. Such an increase in idle speed is caused by an associated engine management system increasing the idle speed to respond to an increased engine load imposed by the switching on of accessories such as air conditioning.

The idle speed signal Vi emerging from block 66 is fed via line 67 to an idle reference setting block 68 which sets an idle signal Vir which is equal to the idle reference speed signal Vi plus an offset (typically the offset is 400 rpm). The idle reference signal Vir is fed to the Highest Wins discriminator 63 via line 69.

As will be described in more detail below, the output of highest wins discriminator 63 (which will be either signal Va', Vfr or Vir depending on whichever is the highest at any given instant) becomes the take-up reference Vtu which is fed to a reference signal selection block 71 via line 72.

The updated idle speed signal Vi is also fed to a drop-out reference setting block 73 which sets a drop-out reference signal Vdo (used during clutch disengagement) which is equal to the idle reference Vi plus a smaller offset (typically the offset is 200 rpm). This drop-out reference Vdo is fed to the reference signal selection block 71 via line 74.

Engine speed signal Ve, driven plate speed signal Vdp from sensor 42 and drop-out reference Vdo are fed to a take-up latch block 75 which processes these signals in accordance with pre-determined criteria (discussed in greater detail below with reference to FIG. 3) to send a signal Vtul of a first value to the reference signal selection block 71 via line 76 when the system is deemed to be in a clutch take-up (engaging) mode and a signal Vtul of a second value when in the drop-out (disengaging) mode. Thus the value of signal Vtul determines whether the selected reference Vr is equal to Vtu or Vdo.

A drop-out reference adjuster 80 is provided which receives engine speed signals Ve and a gear engaged signal from sensor 32. Using a differentiation process, drop-out reference adjuster 80 establishes the rate of deceleration of the engine. If the engine speed is below a predetermined limit (e.g. 3000 rpm) and the rate of deceleration is above a set level (e.g. 2000 rpm/sec) then adjuster 80 generates an offset Vos which is passed to setting block 32 to increase the drop-out reference in a manner proportional to the rate of deceleration.

The reference signal generator 60 described above operates as follows.

During the clutch take-up, the take-up latch 75 is set so that the signal Vtul on line 76 switches the -output Vr of selection block 71 to be equal to the take-up reference Vtu on line 72.

The take-up reference Vtu is either equal to the throttle reference Va', the floating reference Vfr or the idle reference Vir on a highest wins basis from discriminator 63.

Thus, for example, if the operator increases the engine speed substantially above idle and then moves the gear lever 24 to a take-up gear position the system takes a snap shot of the raised engine speed in block 64 and sets a floating reference signal Vfr equal to the snap shot speed plus an off-set (typically 400 rpm). Since in this take-up situation the floating reference is clearly the largest of the three references it becomes the reference Vtu which controls clutch take-up.

Thus until the operator raises the engine speed above the current floating reference value Vfr no actual clutch engagement will occur and hence inadvertent take-up of drive is avoided. When the operator has raised the engine speed above the current floating reference value Vfr the clutch begins to transmit torque and consequently the engine speed falls due to the the imposition of load on the engine. At this point the engine speed is then below the so called "no-load engine speed" for the current throttle setting.

Block 64 is arranged to update the floating reference by ramping it down linearly as long as the engine speed remains below the no-load engine speed for the current throttle setting. This promotes clutch engagement.

Also, if the operator lowers the engine speed the floating reference will track the engine speed down by repeatedly setting itself to current engine speed plus the previously set floating reference offset.

Once the floating reference is below the throttle reference Va', the throttle reference becomes the controlling reference which is outputted from discriminator 63 on the highest wins basis. So that the selected reference Vtu then becomes equal to the throttle reference Va'.

The control unit 36 considers a given clutch take up to be complete when one of the following conditions applies:

3a) the engine speed is within 200 rpm of the driven plate speed, the engine speed is above a predetermined level of say 1500 rpm, and both these conditions have applied for a predetermined time period of say 0.5 seconds, or 3b) the vehicle is in gear with the engine running and the clutch fully engaged, or 3c) the clutch is engaged beyond a predetermined engagement threshold (e.g. beyond a given position of cylinder 22) and the driven plate speed is above a predetermined threshold (eg. idle speed +1200 rpm for first gear and idle speed +800 rpm for the other forward gears).

These criteria 3a, 3b and 3c for the completion of clutch take-up are illustrated in FIG. 3. Criteria 3a are associated with a normal raised engine speed clutch take-up while criteria 3b and 3c are associated with take-up due to raised road speed, a so-called rolling engagement of the clutch.

When the control unit determines that clutch take-up is complete it sets a drop-out reference from block 73 and unlatches the take-up latch 75 so that the selected reference signal Vr then becomes the drop out reference signal Vdo.

The system is thus readied for disengagement of the clutch on any subsequent deceleration of the vehicle.

For example, if the vehicle is travelling with engine speed of 3000 rpm and the operator wishes to draw to a halt, the vehicle engine speed will progressively reduce and when it reaches the drop out reference level (which is typically idle speed plus 200 rpm) the control system will rapidly disengage the clutch since the basic operating philosophy of the system is that the clutch should only begin to transmit torque at the reference signal speed.

If the vehicle undergoes rapid deceleration, for example as a result of an emergency stop, the drop-out adjuster 80 comes into operation and the operative reference Vr becomes equal to the drop out reference Vdo plus the offset Vos. The drop-out adjuster 80 is typically arranged to ramp-up the offset Vos linearly at a rate (higher than normal) proportional to the level of deceleration of the engine.

As will be appreciated by increasing the reference signal Vr which is applied during deceleration by the drop-out adjuster offset Vos the engine speed level at which the clutch begins to disengage is significantly increased and the rate of disengagement is also higher. This results in an earlier disengagement of the clutch than would otherwise occur. In this manner rapid deceleration of the vehicle (and subsequently the engine) can be achieved when required with a reduced likelihood of the engine stalling.

The criteria for determining when drop-out is complete are also illustrated in FIG. 3 at 3d, 3e and 3f. These criteria are:

3d) driven plate speed has fallen below a second predetermined threshold (e.g. 700 rpm), or 3e) engine speed has fallen below a second predetermined level (e.g. 700 rpm) if gearshifting is not occurring, or 3f) the clutch is not clamped (ie. fully engaged) with the driven plate speed below a third predetermined threshold (e.g. 1900 rpm) and first gear is selected with the engine decelerating.

If one of the above criteria 3d,3e or 3f is met clutch drop-out is deemed to be complete and the system resets the take-up latch 75 so that the system switches from the use of the drop-out reference Vdo to the use of the take-up reference Vtu at selection block 71.

When reverse is selected the take-up reference Vtu is used as the operative reference signal for both clutch take-up and drop-out.

We claim:

1. A clutch control system for the automatic control of a motor vehicle clutch (14) which connects an engine (10) with a gearbox (12) under the control of a driver-operated gear ratio selector lever (24), the control system including an electronic control unit (36) which controls initial clutch take-up on starting of the vehicle, clutch re-engagement following each ratio change, disengagement on movement of the gear selector lever (24) to change the operative ratio of the gearbox (12), and clutch disengagement on the coming to rest of the vehicle, the control system further comprising:

a first means to generate a reference signal (Va') which is proportional to the current throttle position;

a second means to generate a reference signal (Vir) which is proportional to the current engine idle speed; and a third means to generate a floating reference signal (Vfr) which is proportional to a recorded engine speed plus an offset;

discriminator means for selecting the highest signal from the signals (Va'), (Vir), and (Vfr) respectively generated by the first, second and third means, to provide a reference signal (Vtu) for initial clutch take-up;

means generating a current engine speed signal (Ve);

means comparing the current engine speed signal (Ve) with the reference signal (Vtu) for initial clutch take-up to produce an error signal E;

means generating a current clutch position signal (Vc); and means comparing the error signal E with the current clutch position signal (Vc) to produce a clutch actuation signal (Vce) which controls the movement of the clutch during initial clutch take-up.

2. A control system according to claim 1 wherein the floating reference signal (Vfr) is ramped down as long as the current engine speed signal (Ve) is below the no-load engine speed for the current throttle setting.

3. A control system according to claim 1 wherein the floating reference signal (Vfr) is reduced to track any reduction in the current engine speed signal (Ve) that occurs when the clutch (14) is not transmitting torque so that the floating reference signal equals the current engine speed signal plus the floating reference offset.

4. A control system according to claim 1 wherein the current engine idle reference signal (Vi) is determined by regularly checking the idle speed (66) when a throttle (16) on the engine (10) is closed, to look for the lowest idle signal speed (Vi) subject to a lower limit.

5. A control system according to claim 4 wherein the lowest idle speed signal (Vi) is increased if the idle speed is found to increase while an accelerator pedal (19) of the vehicle is not pressed when the vehicle is stationary.

6. A control system according to claim 5 wherein a signal representative of clutch driven plate speed (Vdp) is used to indicate when the vehicle is stationary.

7. A control system according to claim 1 wherein clutch engagement is considered complete when the engine speed (Ve) is within a predetermined range of the driven plate speed (Vdp), the engine speed is above a first predetermined level, and both these conditions have applied for a predetermined time period.

8. A control system according to claim 1 wherein clutch engagement is considered complete when the vehicle is in gear with the engine (10) running and the clutch (14) fully engaged.

9. A control system according to claim 1 wherein clutch engagement is considered complete when the clutch (14) is engaged beyond a predetermined engagement threshold and the driven plate speed (Vdp) is above a first predetermined threshold.

10. A control system according to claim 1 including means (73) to set a drop out reference signal (Vdo) on completion of clutch take-up, the drop out reference signal determining the engine speed level (Ve) and disengagement rate at which clutch disengagement occurs as the vehicle engine speed decreases.

11. A control system according to claim 10 wherein when the vehicle engine (10) is decelerating at above a predetermined rate, the drop-out reference (Vdo) is increased so that the clutch (14) will start to disengage at a higher engine speed (Ve) thus preventing stalling of the engine (10).

12. A control system according to claim 1 wherein clutch disengagement is considered complete when the driven plate speed (Vdp) has fallen below a second predetermined threshold.

13. A control system according to claim 1 wherein clutch disengagement is considered complete when the engine speed (Ve) has fallen below a second predetermined level if gearshifting is not occurring.

14. A control system according to claim 1 wherein clutch disengagement is considered complete when the clutch (14) is not fully engaged with the driven plate speed below a third predetermined threshold and first gear is selected with the engine (10) decelerating.

* * * * *